(12) United States Patent
Waldow et al.

(10) Patent No.: US 7,574,937 B2
(45) Date of Patent: Aug. 18, 2009

(54) CONTROL DEVICE FOR ELECTRONIC MULTI-STEP GEAR SHIFTING CONTROL IN AUTOMATIC TRANSMISSIONS

(75) Inventors: Andreas Waldow, Einbeck (DE); Stephan Grossmann, Halle/Saale (DE); Axel Wack, Einbeck (DE); Guido Naumann, Allendorf (DE); Markus Jaekel, Wuerzburg (DE)

(73) Assignee: Teleflex Automotive Germany GmbH, Dassel (DE)

( * ) Notice: Subject to any disclaimer, the term of this patent is extended or adjusted under 35 U.S.C. 154(b) by 0 days.

(21) Appl. No.: 11/052,699

(22) Filed: Feb. 7, 2005

(65) Prior Publication Data

US 2005/0172746 A1 Aug. 11, 2005

(30) Foreign Application Priority Data

Feb. 7, 2004 (DE) .................. 10 2004 006 150

(51) Int. Cl.
*B60K 17/04* (2006.01)
*B60K 17/12* (2006.01)
(52) U.S. Cl. .................. 74/473.12; 74/473.18; 335/205
(58) Field of Classification Search ............. 74/473.12, 74/473.18, 473.33; 335/205–207
See application file for complete search history.

(56) References Cited

U.S. PATENT DOCUMENTS

| | | | | |
|---|---|---|---|---|
| 5,406,860 A * | 4/1995 | Easton et al. | .................. | 74/335 |
| 5,622,079 A | 4/1997 | Woeste et al. | .................. | 74/335 |
| 5,689,996 A | 11/1997 | Ersoy | .................. | 74/335 |
| 5,845,535 A | 12/1998 | Wakabayashi et al. | ... | 74/473.18 |
| 5,913,935 A * | 6/1999 | Anderson et al. | ............. | 74/335 |
| 6,282,973 B1 * | 9/2001 | Sander et al. | ............ | 74/473.18 |
| 6,307,365 B1 * | 10/2001 | Santos et al. | ........... | 324/207.12 |
| 6,382,045 B1 * | 5/2002 | Wheeler | .................. | 74/473.12 |
| 6,431,339 B1 * | 8/2002 | Beattie et al. | ............ | 192/220.4 |
| 6,530,293 B1 * | 3/2003 | Ruckert et al. | ........... | 74/473.12 |
| 6,550,351 B1 * | 4/2003 | O'Reilly et al. | ............... | 74/335 |
| 2003/0056613 A1 | 3/2003 | Altenkirch et al. | ....... | 74/473.18 |

FOREIGN PATENT DOCUMENTS

| | | |
|---|---|---|
| DE | 42 17 773 | 12/1993 |
| DE | 44 26 207 | 8/1995 |
| DE | 697 06 449 | 7/1997 |
| DE | 196 08 981 | 9/1997 |
| DE | 199 38 528 | 2/2001 |

(Continued)

*Primary Examiner*—Marcus Charles
*Assistant Examiner*—James Pilkington
(74) *Attorney, Agent, or Firm*—Darby & Darby

(57) ABSTRACT

A control device for electronic multi-step gear shifting control of an automatic transmission for motor vehicles functions to shift gears by means of the tip actuation of a selector lever with a shifting journal that can be pivoted from the automatic shift lane into the multi-step shift lane. The control device is configured as a tip shifting module in the form of a compact modular component with a sturdy housing. The tip shifting module serves to secure and hold in place several mechanical modules and electronic modules located therein and convert the mechanical shifting movement of the selector lever imparted on the input side into electric control signals that can be tapped at the output side of the module. A multi-track encoded magnet arranged in the housing of the module together with several Hall sensors ensures a reliable generation of switching signals.

6 Claims, 4 Drawing Sheets

FOREIGN PATENT DOCUMENTS

| | | |
|---|---|---|
| DE | 199 59 616 | 6/2001 |
| DE | 100 22 043 | 11/2001 |
| DE | 102 27 633 | 1/2004 |
| EP | 1 036 959 | 9/2000 |
| EP | 1036959 * | 9/2000 |

* cited by examiner

CONTROL DEVICE FOR ELECTRONIC MULTI-STEP GEAR SHIFTING CONTROL IN AUTOMATIC TRANSMISSIONS

Priority is claimed to German Patent Application No. DE 10 2004 006 150.5, filed on Feb. 7, 2004, the entire disclosure of which is incorporated by reference herein.

The present invention relates to a control device for electronic multi-step gear shifting control for automatic as well as manual transmissions used in motor vehicles.

BACKGROUND

Generally speaking, modern automatic transmissions for motor vehicles offer the attractive capability of shifting the individual gears of the vehicle up or down manually as well. In other words, the driver can choose between two modes of operation, namely, automatic shifting operation and multi-step shifting operation. In order to select the modes of operation and the individual shifting stages (gears), in many cases, a selector lever is provided that can be pivoted into both shift lanes, namely, the automatic shift lane or the multi-step shift lane, in order to engage the selected shifting positions. Here, the two shift lanes, which are usually arranged in the lengthwise direction of the vehicle, are linked to each other in such a way that the selector lever can easily be pivoted from one shift lane into the other. When the selector lever is in the automatic shift lane, it can be pivoted into the familiar shifting positions D, N, R and P by actuating the gearshift and can be held in this position by locking means.

The desired shifting stage (gear) is selected by the specific position taken by the selector lever in the shift lane.

Here, in order to detect each of the positions of the selector lever, sensor elements are usually arranged as signal generators in a suitable place in the gear shifting gate. If a specific position of the selector lever is detected, then the signal generator located at that position sends a corresponding signal to the electronic control device of the automatic transmission. The evaluation of the switching signals in the automatic mode of operation or in the multi-step mode of operation as well as the actuation of the gears are carried out by the electronic control device.

When the selector lever is pivoted into the multi-step shift lane, the mode of operation "multi-step shifting mode" is activated by a signal or by a mechanical shifting procedure in the electronic control device of the automatic transmission.

The individual shifting stages (gears) can then be shifted up or down stepwise by means of the tip actuation of the selector lever. In this process, the tipping movement of the selector lever to shift up (+) or down (−) can likewise be detected by means of the signal generator and a corresponding switching signal is transmitted. Numerous proposals have been made for the technical configuration and improvement of a multi-step shifting control device used in automatic transmissions. Thus, DE 4217773 A1 describes a multi-step shifting control device of this generic type that can be operated by means of a selector lever in only one shift lane. The selector lever is divided in the middle so that the upper part can be moved under a slight deflection independently of the lower part. The switchover from automatic shifting operation to the multi-step shifting mode is effectuated here by actuating a manual switch that is arranged on the gear shifting gate and that engages with a locking pin that affixes the lower part of the selector lever. Now, as far as the pivoting range of the selector lever is concerned, the latter is locked in the lower pivoting point for automatic shifting, but in its spring-loaded middle position, it can be tipped at the middle pivot point within the range of spring defined by the contacts of the tip switch. The tip signals are transmitted to the electronic control device, which then triggers the manually initialized gear shifting procedures.

After the actuation of the tip switch, the selector lever is reset in the direction of the middle position of the gear shifting gate by a pressure spring mounted onto each tip switch.

A drawback of this arrangement has to do with the reliability of the mode of functioning of a divided selector lever that has to reliably assume a considerable number of shifting positions that are difficult to hold in place. The driver is also forced to operate an additional switch when changing into the multi-step shifting mode.

A number of recent developments disclose an arrangement that seems to be attractive to drivers, namely, two separate shift lanes in which contact-free semiconductor sensors are used to ascertain the position of the selector lever.

This is the case, for example, in DE 10022043 A1, where the position generators on the selector lever are configured as Hall generators and are mounted at the corresponding shifting positions. The multi-step shifting pulses to be transmitted to the gear control device are generated by the magnetic induction of a permanent magnet attached to the selector lever whose magnetic field reaches the detection area of the appertaining Hall sensor as a result of the shifting movements.

DE 19938528 A1 also discloses a control means for manually shifted automatic transmissions in which a selector lever can be moved in two shift lanes that are connected to each other. Hall sensors, in combination with a permanent magnet mounted on the selector lever, are once again proposed as position generators. The Hall sensors are arranged in the gear shifting gate and, like the selector lever gate, are always covered by shutters.

In this prior-art arrangements of multi-step shifting control devices, especially the sensor components, which are discrete and sensitive to external influences, are arranged relatively unprotected in the vicinity of the gear shifting gate. Moreover, the selective attachment, for example, of the position generators (sensors) or else of the permanent magnets on the frame components of the gear shifting gate and on the selector lever also require greater effort and more error-prone work during the assembly and adjustment of the automatic transmission selector.

Another state of the art is described in DE 4426207 C1. This invention likewise relates to a selector lever for an automatic transmission with two separate shift lanes, said selector lever having a projection in its lower section that, when pivoted into the multi-step shift lane, engages in a positive manner with the effective surfaces of the multi-step shifting means and transfers the mechanical shifting movement to the multi-step shifting means. In order to detect these selector lever movements, there is a sensor means (not described in greater depth there) which forwards the generated switching signals to a gear control device. In this case, the pivoting movements of the selector lever in the multi-step shift lane are made against the force of a spring (not shown there) that continuously returns the selector lever to the middle position after the tip shifting movement. The open construction likewise selected here probably entails drawbacks in terms of maintenance, reliability (fail-safe properties) and assembly work that are similar to the drawbacks of the other abovementioned solutions.

EP 1036959 B1 describes a control means for electronic step-by-step shift control of an automatic transmission for motor vehicles in order to shift gears up and down by means of the tip actuation of a selector lever, said control involving optical sensors, an approach that requires a great deal of space. This system has the drawback that it cannot be diagnosed.

DE 102 27 633 A1 describes an encoded gear position switch that is suitable for an automatic transmission but not for automatic shifting with a tip function or a tip lane. This gear position switch does not have a mechanical resetting feature and is not configured with a modular design.

DE 697 06 449 T2 describes a gearshift means for a vehicle that is configured with a modular design and that has circuit boards. However, multi-track encoded magnets are not disclosed in this document.

DE 196 08 981 A2 describes a shifting device for the gears of motor vehicles whereby, during the shifting procedure, a selector lever is coupled to a control vane that reflects a signal that is detected by sensors and that is forwarded to a gear control device as a signal corresponding to the shifting position of the shifting lever. The shifting device is not configured with a modular design. A multi-track magnet is not disclosed in this document either.

DE 199 59 616 A1 describes a control device for a gearbox for automatic and manual shifting in a motor vehicle, in which there are two magnets, whereby one simple magnet serves for diagnostics in a normal shift lane and another magnet serves as the tip magnet. The control device has the drawback that two magnets are needed, which calls for a larger installation space and makes it more susceptible to malfunctions.

SUMMARY OF THE INVENTION

An object of the present invention is to avoiding drawbacks of the above-mentioned control devices for multi-step shifting control and to configure and improve the control devices in such a way that assembly and maintenance work as well as reliability, service life and ease of use are improved. An additional or alternate object of the present invention is to provide a redundant regulation with diagnostic capabilities and intermediate signals between plus and minus within a small installation space, without the need for multiple magnets.

The present invention provides a control device for electronic multi-step gear shifting control of an automatic transmission for motor vehicles, in order to shift gears up and down stepwise by means of the tip actuation of a selector lever with a shifting journal that can be pivoted from the automatic shift lane into the multi-step shift lane. The control device includes a receiving means suitably shaped for creating an effective connection with the shifting journal, whereby said receiving means receives the shifting movements of the selector lever and comprising a sensor means that serves to convert the shifting movements into electric switching signals that are forwarded to the electronic gear control device, whereby the receiving means is configured as a cam module (3) with a fitted cam clip (6) and said receiving means forms a positive effective connection with the shifting journal of the selector lever for purposes of force transmission in the multi-step shifting operation, whereby the cam module (3) is arranged in the housing (2) so that it can move back and forth, upwards + or downwards −, in the tip shifting direction, and the cam module (3) comprises a magnet housing (14) and a multi-track encoded magnet (13) arranged therein which, together with the cam module (3), is arranged so as to move in both tip shifting directions.

Accordingly, the control device is configured as a tip shifting module 1 in the form of a compact modular component with a sturdy housing 2, which is shaped so as to secure and hold in place the mechanical modules 3 to 8, 14 and the electronic modules 9 to 13, 16 located therein.

The arrangement and configuration of the modules are done according to the invention in such a way that the mechanical shifting movement of the selector lever imparted on the input side, whose shifting journal engages in a positive manner with the cam module and moves it in the tip shifting direction (+) or (−), is converted into electric control signals that can be tapped at the output side of the tip shifting module 1 via the contact pin 9.

A multi-track encoded permanent magnet is securely connected to the cam module 3 and is moved by the tip shifting movement over the Hall sensors 10, 16 arranged on the circuit board 14. Here, the different encoding, that is to say, differently magnetized areas (north pole-south pole) of the magnet 13 and the particular actuation of the Hall sensors 16 can generate shifting-dependent Hall signals that are interpreted by the automatic control device as different switching signals, thus triggering the desired shifting procedure.

The plug-in connection with the contact pins 9 can now connect the tip shifting module according to the invention to the automatic control device in a simple manner from the standpoint of signal technology. The automatic selection actuation upon which the inventive use is based has a multi-step shift lane that is connected to the automatic shift lane, and the selector lever with its shifting journal can be pivoted into said multi-step shift lane.

In order to operate the control device, the lane recognition magnet 11 is moved towards the housing cover 4 of the tip shifting module 1 by moving the selector lever from the automatic shift lane into the multi-step shift lane, as a result of which the magnetic field of the tip shifting module 1 induces electric switching signals in the lane recognition Hall sensor 10, whereby said switching signals are transmitted to the electronic control device of the automatic transmission via the contact pin 9 and they activate the Tiptronic function for the manual multi-step shifting operation.

Moreover, moving into the multi-step shift lane causes the shifting journal of the selector lever to engage in a positive manner with the cam clip 6 of the movable cam module 3, whereby the selection of the gears is made by the tip actuation of the selector lever in the lengthwise direction of the multi-step shift lane, as a result of which the shifting journal briefly moves the cam module 3 with the multi-track encoded magnet 13 in the shifting direction by a position that is fixed by the flexible roller latch 5, whereby the magnet 13 is moved over the Hall sensors 10, 16 that are each arranged in complementary positions on the circuit board 12 in order to generate a switching signal.

By suitably positioning the multi-track encoded magnets 13, the sensors 16a, 16b, 16c generate different electric tip switching signals in such a way that the Hall sensor 16b is activated when the selector lever and the magnet 13 are in the middle position (neutral). The Hall sensor 16a or 16c is in the tip shifting positions (+), (−), and both Hall sensor groups 16a and 16b or 16c and 16b are in the appertaining intermediate positions of the tip movement, whereby the lane recognition sensor 10 is always activated when the selector lever is in the tip shift lane.

BRIEF DESCRIPTION OF THE DRAWINGS

The invention is explained below by an embodiment and with reference to the drawings, in which.

DETAILED DESCRIPTION

Figure 1:
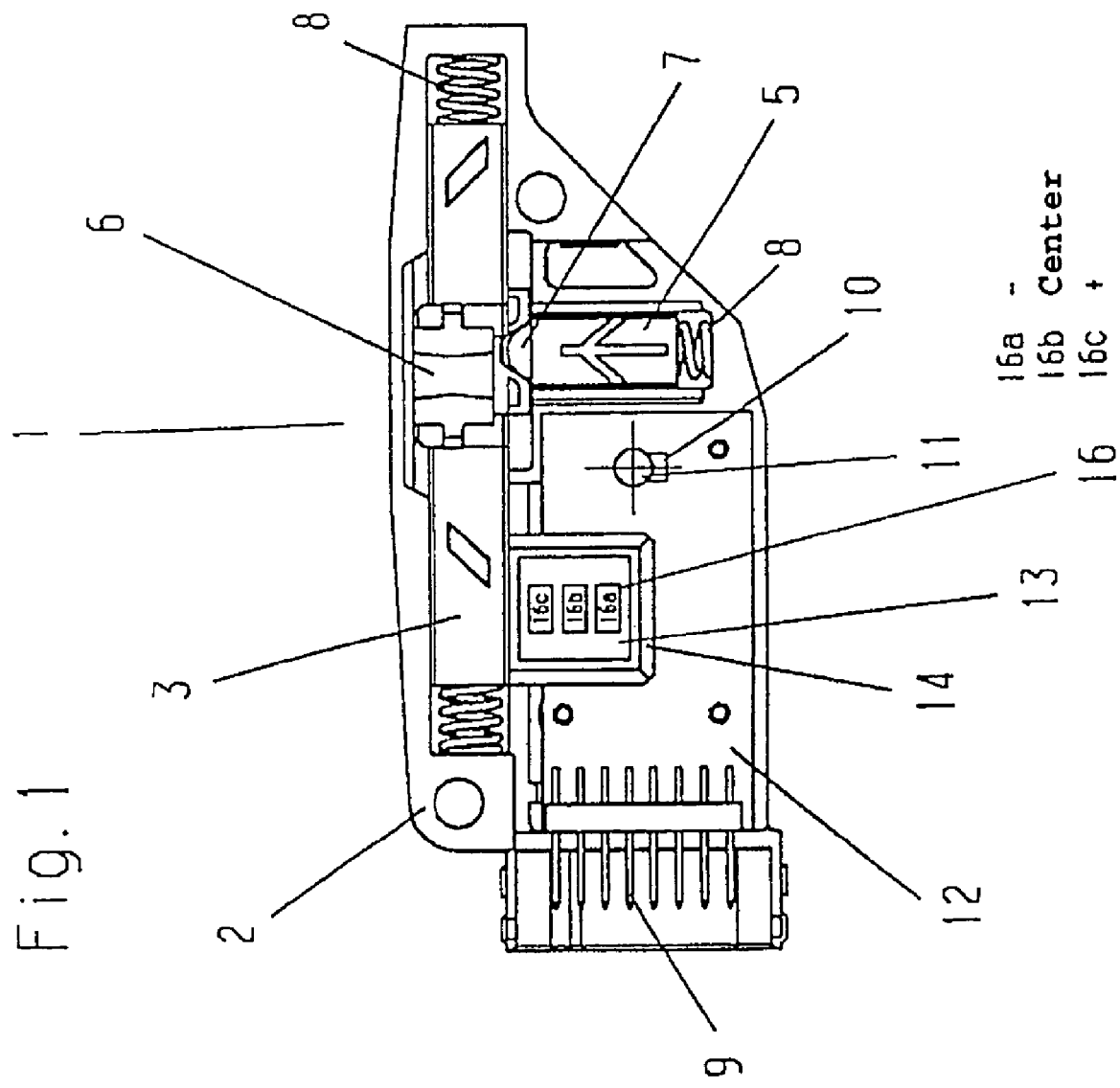
FIG. 1 shows a cross section through the control device according to the invention with the cam module 3 and the multi-track encoded magnet 13 in the middle position.

As shown in FIG. 1, the control device for electronic multi-step shifting control consists of a tip shifting module 1 that is connected to an electronically controlled automatic transmission and to a selector means. The selector lever of the selector means is fitted with a shifting journal of a conventional type that engages in a positive manner with the cam clip 6 of the cam module 3.

The cam module 3 as well as the other components of the tip shifting module 1 are accommodated in a sturdy housing 2 that is preferably made of fiberglass-reinforced plastic and that can be manufactured in a generally known manner by means of injection molding. Here, the cam module is movable in the shifting direction, so as to fit into the indentation of the upper housing part shaped for this purpose, and it extends over almost the entire housing 2. At each of the ends in the lengthwise orientation of the cam module 3, there are return springs 8 that move the module 3 back into the neutral middle position (normal position) of the multi-step shift lane after a shifting deflection by the selector lever into one of the two tip shifting directions (+) or (−). The selector lever is secured in its normal position by the flexible roller latch 5 that engages with the cam clip 6 below the cam module 3. A pressure point and a force-path characteristic line of the selector lever are realized by means of the roller guide and the roller 7 as well as by the return spring 8.

The magnet housing 14 and the multi-track encoded magnet 13 are securely connected to the movable cam module 3.

Figure 2:
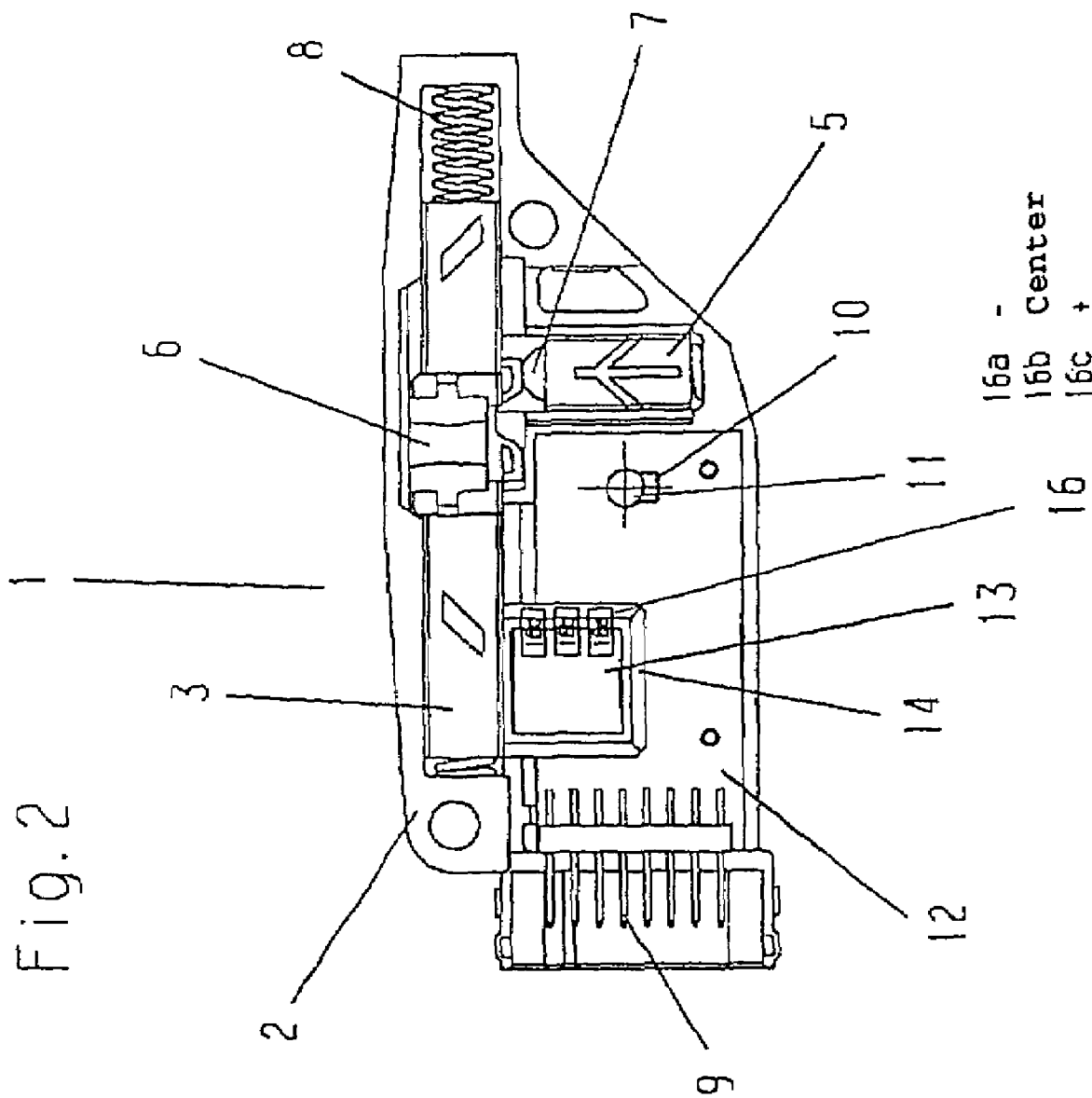
FIG. 2 shows a cross section like in FIG. 1 with a shifting deflection of the cam module 3 by a tip shifting movement.

The magnet 13 is arranged at a distance that lies within its effective magnetic field range, opposite from the Hall sensors 16a, 16b, 16c (position generators). In accordance with the selected tip shifting movement, the magnet 13 is moved over the Hall sensors 16 arranged on the circuit board 12 and it induces a signal corresponding to the direction of movement. When the selector lever is in the middle position (neutral), the Hall sensor 16b is activated by the magnet 13, whereas when the selector lever is in the intermediate position (FIG. 2), the sensors 16a or 16c and 16b are activated, and when the selector lever is in the tip shifting positions (+) and (−), only the sensor 16c or 16a is activated.

The different switching signals generated in this manner are transmitted via the conductor tracks of the circuit board 12 to the contact pins 9 and to their plug-in connection in order to control the automatic transmission. The signal evaluation of the automatic transmission moves one shifting stage (gear) up or down, as a function of the received signal.

The (encoded) magnet 13, which is divided into several sections with different magnetic field directions, generates specified switching signals according to the direction of movement of said magnet over the Hall sensors 16. Here, the encoding of the magnet 13 in several north pole-south pole areas allows a more precise coordination of the shifting procedures and shorter shifting distances.

The Hall sensor 10 arranged on the circuit board 12 serves for purposes of lane recognition, that is to say, for recognizing the desired mode of operation, namely, the automatic shifting mode or the multi-step shifting mode. A lane recognition magnet 11 that is connected to the selector lever can be positioned across from this sensor 10. If the selector lever is in the automatic shift lane (P,R,N,D), the tip shifting module 1 according to the invention is not mechanically connected to the selector lever. The lane recognition sensor 10 is always active as soon as the selector lever is in the multi-step shift lane (tip lane).

During the changeover from the automatic shift lane to the multi-step shift lane, the shifting journal 21 of the selector lever is inserted into the cam clip 6 and the lane recognition magnet 11 is moved towards the housing cover 4 of the tip shifting module 1. As a result, the Hall sensor 10 on the circuit board 12 that is located in the effect field of the magnet 11 is activated and an electric signal is sent to the gear control device, which then causes the initiation of the Tiptronic function of the automatic transmission In FIG. 2, the cam module 3 was moved into a tip shifting position (−) by a tip shifting movement of the selector lever.

In this manner, the multi-track encoded magnet 13, which was also carried along, activates the hall sensor 16c, which transmits a switching signal corresponding to the tip movement to the gear control device.

Figure 3:
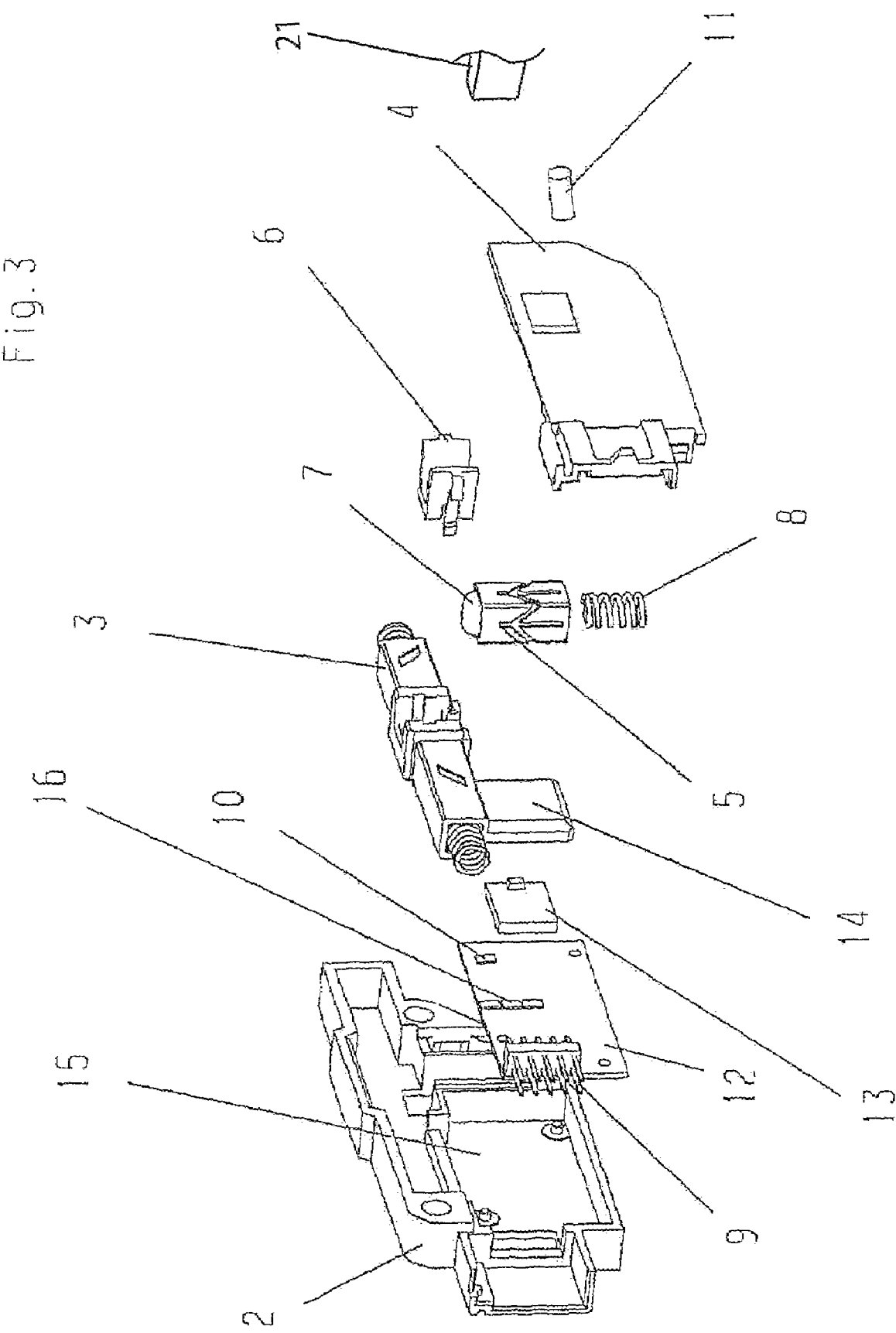
FIG. 3 shows an exploded view of essential components of the control device.
Figure 4:
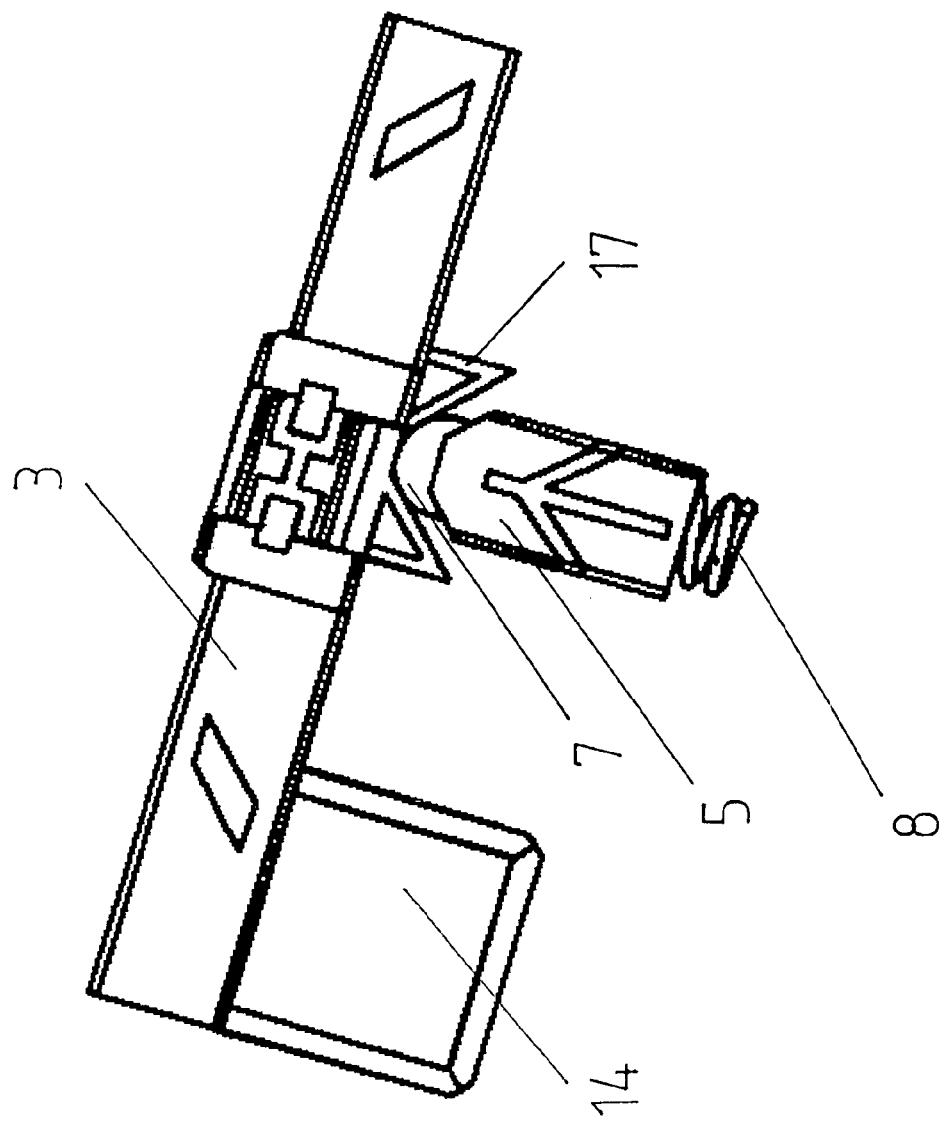
FIG. 4 shows the cam module according to the present invention with two slanted members 17 disposed thereon.

FIG. 3 shows the individual modules of the tip shifting module 1 in an exploded view.

Here, the lane recognition magnet 11 is mounted on the selector lever.

In comparison to the state of the art, the invention has numerous advantages. Thus, for example, all of the function-relevant modules are accommodated in a sturdy housing and protected against damage or dirt caused by dust or oil. This aspect is of great importance for the proper functioning, the reliability and the service life of the electronic components, especially of the Hall sensors mounted on the circuit board. Moreover, the assembly and adjustment work is less when the automatic selector means are assembled since, in a simple manner, the module combines the components of a multi-step shift control device, which used to be scattered, so that this module is easy to replace and install in a prepared position.

By using a multi-track encoded magnet in conjunction with the Hall sensors arranged on the circuit board as position generators, the gear control device reliably generates selectable switching signals, whereby only a very small installation space is needed for the requisite components.

What is claimed is:

1. A control device for electronic multi-step gear shifting control of a motor vehicle automatic transmission for shifting gears up and down stepwise using tip actuation having an automatic shift mode and a multi-step shift mode, the control device engageable with a selector lever as a tip shifting module in the form of a compact modular component, the control device comprising:

a housing;

a cam module disposed in the housing;

a cam clip received in the cam module and configured to move with the cam module, the cam clip being engageable with the selector lever;

a flexible roller latch for securing a position of a roller and disposed perpendicular relative to the cam module and engageable with an indentation of the cam clip so as to return the selector lever to a middle position and to achieve a force-path characteristic line;

a multi-track encoded magnet comprising a plurality of regions, each region generating an associated magnetic field, wherein the associated magnetic fields of at least two of the plurality of regions differ, the multi-track encoded magnet being fixed to the cam module, the cam module and encoded magnet being moveable back and forth in upward and downward tip shifting directions;

a position sensor configured and arranged such that as the differently magnetized areas of the multi-track encoded magnet move over the position sensor when the cam module is moved in the tip shifting directions, the position sensor acts to convert the shifting movements of the multi-track encoded magnet into electric switching signals;

a lane recognition sensor configured and arranged in the housing to detect the proximity of a lane recognition magnet, such that when the lane recognition magnet enters a radius of action of the lane recognition sensor, the control device is moved from automatic shift mode into multi-step shift mode; and a circuit board securely connected to the housing and a contact pin, and wherein the contact pin, the position sensor, and the lane recognition sensor are disposed on the circuit board.

2. The control device as recited in claim 1, wherein the cam module is longitudinal and has two ends, and further comprising:

two springs, each disposed between one of the two ends and a wall of the housing, the springs being configured to move the cam module into a center position.

3. The control device as recited in claim 1, further comprising a further sensor and a further contact pin disposed on the circuit board at a defined distance from each other and configured to establishing a electric plug-in connection for transmitting switching signals to an electronic control circuit of the automatic transmission, the sensors being electrically conductively connected to the contact pins using conductor tracks of the circuit board.

4. The control device as recited in claim 1, further comprising two inclined members disposed on the cam member on each side of the roller latch such that the position of the roller is secured by the inclined members of the roller latch.

5. The control device of claim 1, wherein the cam module moves linearly.

6. The control device of claim 1, wherein the path the cam module moves is defined by the housing.

* * * * *